United States Patent Office 3,477,275
Patented Nov. 11, 1969

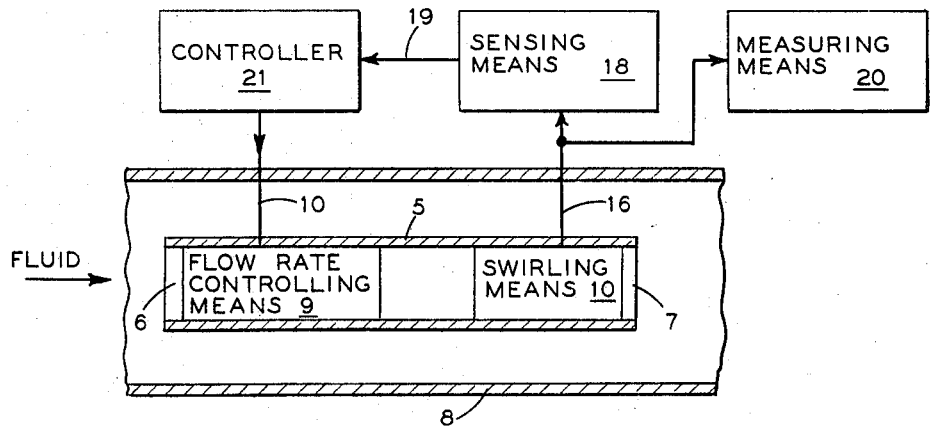
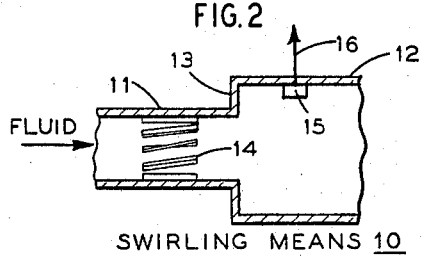
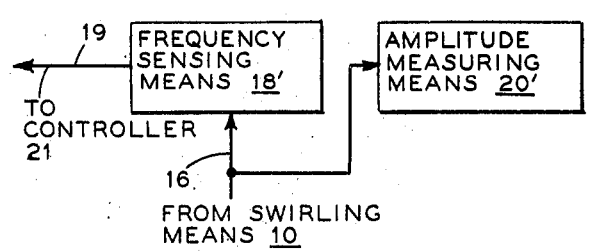
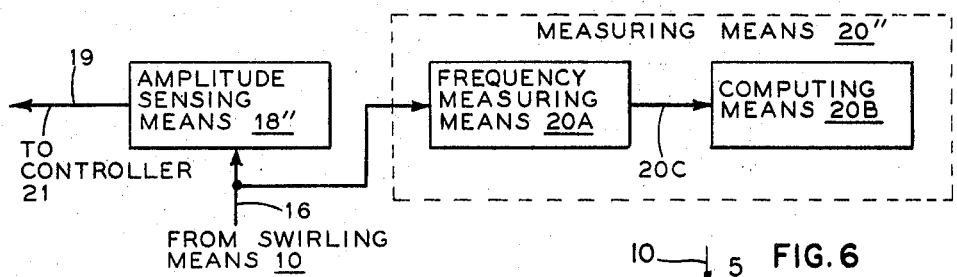
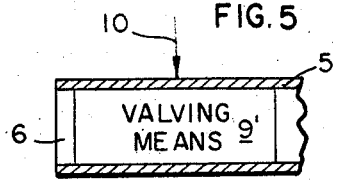
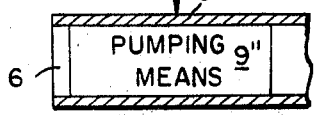
INVENTOR.
Alan E. Rodely
BY
ATTORNEY

3,477,275
DENSITOMETER
Alan E. Rodely, Scotch Plains, N.J., assignor to American Standard Inc., a corporation of Delaware
Filed Feb. 25, 1966, Ser. No. 529,986
Int. Cl. G01n 9/32
U.S. Cl. 73—32      7 Claims

ABSTRACT OF THE DISCLOSURE

The present invention describes a densitometer and a method for recording the density of a continuous flowing fluid. The device comprises a unit which will induce the fluid to swirl and precess causing frequency and amplitude parameters. One of these parameters is fed to a control unit to maintain constant flow rate and the other parameter will measure the density of the fluid.

---

This invention pertains to the measurement of the density (specific gravity) of fluids and is ideally suited to the measurement of a continuously flowing fluid.

Densitometers fall into several general types. First may be mentioned the weighing type which weighs a given volume of the fluid. Such devices require delicate mechanical balances which are subject to wear and cannot measure flowing fluids. Another type is the radiation absorption type which is undesirable in measuring certain fluids. A further type is the differential pressure type which measures the hydrostatic pressure of a vertical column of liquid. Such devices require the controlling of parameters such as the height of the column and the minimizing of the viscous drag of the fluid. A still further type utilizes the dependence on the acoustic energy propagation properties of the fluid. However, devices of this type require specialized energy transmitting and receiving transducers.

It is a general object of the invention to provide a density measuring apparatus which has none of the limitations of the above cited types of densitometers.

Another object of the invention is to provide an improved densitometer which is ideally suited for measuring and recording the density of a continuously flowing fluid and which may be readily incorporated into an automatic process control wherein the density is continuously monitored for recording or feedback control.

A further object of the present invention is to provide an improved densitometer which, on the one hand, has a minimum of moving parts and requires a minimum of maintenance, while on the other hand, has greater sensitivity and more universal application than presently available density measuring devices.

Briefly, in this invention, the fluid whose density is to be measured is first forced to have a swirl component by converting pressure energy into kinetic energy. The fluid is then induced into a particular state of hydrodynamic instability which causes the low pressure center of the swirling fluid to precess at a discrete frequency about the flow centerline.

This precession, an oscillatory fluid motion, shall here be defined as swirl precession. The rate or frequency of swirl precession is directly proportional to the volumetric flow rate of the fluid. The pressure amplitude of the swirl precession is proportional to the density of the fluid and also to the square of the frequency of the precession.

Therefore, by detecting the cycling of the swirling fluid for a constant flow rate the density of the fluid can be measured.

Other objects and many attendant advantages of the invention will be readily appreciated from the following detailed description when read with the accompanying drawing which shows, by way of example and not limitation, the now preferred embodiment of the invention.

In the drawing:

FIG. 1 is a drawing, partially in schematic, of apparatus for practicing the invention which includes a swirling means;

FIG. 2 is a sectional view of the swirling means of FIG. 1;

FIG. 3 is a block diagram of one embodiment of the sensing means and measuring means configuration of FIG. 1;

FIG. 4 is a block diagram of another embodiment of the sensing means and measuring means configuration of FIG. 1;

FIG. 5 is an odd diagram of another embodiment showing the flow rate controlling means as a valving means; and FIG. 6 is a box diagram of another embodiment showing the flow rate controlling means as a pumping means.

Referring now to FIG. 1, there is shown a conduit 5 having an inlet 6 and an outlet 7 to constrain fluid which may be flowing in a pipeline 8 to traverse a given path. A flow rate controlling means 9 is disposed in the inlet 6 for controlling the rate of flow of fluid in conduit 5 in response to signals received from line 10. Flow rate controlling means 9 can take many forms and is preferably a solenoid operated valve as shown in FIG. 5 whose valving action is proportional to the amplitude or frequency of the signal on line 10 or an electromechanical pump whose delivery rate is controlled by the amplitude or frequency of the signal on line 10.

The fluid on leaving flow rate controlling means 9 enters swirling means 10 where it is induced into swirl precession. Means 10 first causes the fluid to assume a swirl component having a center of low pressure and then causes the low pressure center to precess.

In FIG. 2 there is illustrated the swirling means 10. A first fluid conductor means 11 and a second fluid conductor means 12—the second conductor means having an internal diameter larger than the internal diameter of the first conductor means—can be coupled together through an abrupt coupling means 13 such as a wall member positioned at substantially right angles to each of the conductor means. Swirl inducing means 14 are coupled to the first fluid conductor means 11 to force the fluid flowing through the first conductor means into a swirling motion. The swirl inducing means 14 can be in the form of fixed blades positioned within the conductor means 11, or convolutions positioned within the interior surface of the conductor means 11 or vanes positioned along the interior surface of the conductor means 11. It has been found that the linearity of this device is determined by the design of the swirl inducing means. For example, a linear device is obtained if fixed blades with a given exit angle with respect to the pipe axis are used. Furthermore, although an abrupt transition has been described, the desired swirl precession can be induced by a gradual transition.

When the swirling fluid enters the larger conductor means 12 it starts precessing, i.e., the center of low pressure of the fluid revolves around the centerline of flow. The frequency of the swirl precession is proportional to the rate of flow and the amplitude of the swirl precession is proportional to the square of the frequency of the precession and to the density of the fluid.

Since the swirling flow is precessing there are velocity, pressure and temperature fluctuations present in the flow. Accordingly, a transducer means 15 is positioned in the region of the swirl precession to detect the pressure variations. There are several methods and electromechanical transducers by which the frequency and amplitude of the swirl precession can be detected. A pressure sensitive means such as a diaphragm pressure transducer or piezoelectric crystal or the like can be utilized to measure the fluctuations of pressure.

In any event, transducer means 15 converts the fluid dynamic parameter to an electric signal which is transmitted on line 16. The signal will have an amplitude parameter and a frequency parameter proportional to the amplitude and frequency parameters of the swirl precession.

Returning to FIG. 1, one of the parameters is sensed by sensing means 18 (connected to line 16) which generates a control signal which is fed to line 19 for use in controlling the rate of flow of fluid in conduit 5. The other parameter is measured by measuring means 20 to indicate the density of the fluid.

By virtue of the relationship among the density, flow rate, swirl precession frequency and amplitude parameters, the sensing means and measuring means can take various forms.

For example, the frequency of swirl precession can be utilized to maintain the flow rate and frequency constant while the amplitude of the swirl precession is measured to indicate the density of the fluid. In such a case, the apparatus of FIG. 3 is utilized. Frequency sensing means 18' can be a frequency detector which generates a signal whose amplitude is proportional to the frequency of the signal on line 16. Amplitude measuring means 20' can be a peak detector which transmits a signal whose amplitude is proportional to the instantaneous peak amplitude of the signal on line 16. The output of the peak detector can be connected to a suitably calibrated analog-to-digital converter if a digital indication of the density is desired or to a suitably calibrated meter device if an analog indication is desired. Of course, it should be apparent that the signals from the measuring device can be utilized in an overall process control system.

It is also possible to utilize the amplitude of the signal on line 16 to control the rate of flow to keep the amplitude constant and to measure the frequency of the signal on line 16 to indicate the density of the fluid. The configuration of elements in FIG. 4 can be used to mechanize such an approach. In particular, amplitude sensing means 18'' (again a peak detector) is connected to receive the signal on line 16. Means 18'' then transmits on line 19 a signal proportional to the peak amplitude of the swirl precession. Measuring means 20'' comprises a frequency measuring means 20A which can be similar to frequency sensing means 18'. In such a case, the signal so generated is transmitted via line 20C to computing means 20B which is an analog computer which generates a signal that is proportional to the inverse of the square of the received signal. Computing means 20B can include a suitably calibrated meter device to indicate density. It is also possible that the analog signal manipulation can be replaced by a suitably calibrated meter directly. Alternatively, where a digital indication is required, frequency measuring means 20A can take the form of a digital frequency counter that feeds a digitally coded signal via line 20C to computing means 20B having the form of a digital computer which performs the inverse square operation.

The output of sensing means 18, as heretofore described, is a signal having an amplitude proportional to one of the swirl precession parameters. This signal is fed via line 19 to controller 21. Controller 21 generates a signal whose magnitude is related to the difference between the amplitude of the signal on lead 19 and a predetermined reference amplitude. The signal from controller 21 is fed via line 10 to flow rate controller means 9 which changes the rate of flow of fluid. Controller 21 may be a differential servo amplifier whose one input is a reference amplitude signal, whose other input is the signal from sensing means 18, and whose output is an error signal proportional to the difference in the amplitude of the two input signals. The error signal may be fed to another amplifier which generates a signal so phased with respect to the signal on line 19 that the output signal of controller 22 drives flow rate controlling means 9 in such a direction to null the error signal. Thus, flow rate controlling means 9, conduit 5, swirling means 10, sensing means 18 and controller 21 comprise a closed loop servo system with negative feedback. For example, assuming that flow rate controlling means 9 is a solenoid valve whose degree of closure increases with increasing input signal, and sensing means 18 senses for the frequency of the swirl precession, then as the rate of fluid flow increases beyond a given value, the swirl precession frequency increases, the amplitude of the signal on line 19 increases, the error signal increases, the signal on line 10 increases and the size of the passage through the valve decreases to decrease the rate of fluid flow. An inverse effect will occur when the rate of flow decreases below the given value. Similar operations will occur when flow rate controlling means 9 is a pump as shown in FIG. 6. The same type of analysis can be shown when sensing means 18 senses for the amplitude of the swirl precession.

In order to initially calibrate the system, a fluid of known density is fed through conduit 5, the reference amplitude signal is adjusted until the measuring means indicates the known density. After that the density of unknown fluids can be measured.

There has thus been shown an improved method of measuring the density of a fluid by generating a swirl precession in the fluid. One of the parameters of the swirl precession is used to maintain the flow rate of the fluid constant so that the magnitude of the other parameter indicates the density of the fluid. Apparatus utilized to exploit such a method is very simple and has a minimum of moving parts. In fact, any wear of the moving part (flow rate controller) is compensated for by negative feedback control so that no accuracy in measurement is lost due to wear.

What is claimed is:

1. Apparatus for indicating the density of a fluid comprising: a conduit including an inlet for receiving fluid to be measured and an outlet, swirling means connected to said outlet for inducing the fluid that flows through said conduit to have a center of low pressure which precesses, said precession having frequency and amplitude parameters, said frequency parameter being a function of the rate of flow of the so constrained fluid, said amplitude parameter being a function of said frequency parameter and the density of the fluid, transducer means connected to said swirling means for translating the fluid dynamic manifestation of the precession to a signal having frequency and amplitude parameters related to the frequency and amplitude parameters of the precession, respectively, sensing means for sensing one of the signal parameters, flow controlling means connected to said sensing means for maintaining the rate of flow entering said conduit so that said one parameter is maintained at a given constant value, and measuring means for measuring the other of the signal parameters to indicate the density of the fluid.

2. The apparatus of claim 1 wherein said sensing means senses the frequency parameter of the signal generated by said transducer means, and said measuring means measures the amplitude parameter of said signal.

3. The apparatus of claim 2 wherein said flow controlling means includes signal operated valve means whose valving action is related to the frequency parameter of the signal generated by said transducer means.

4. The apparatus of claim 2 wherein said flow controlling means includes pump means whose pumping action is related to the frequency parameter of the signal generated by said transducer means.

5. The apparatus of claim 1 wherein said sensing means senses the amplitude parameter of the signal generated by said transducer means, and said measuring means includes means for measuring the frequency parameter of said signal and computing means for indicating the reciprocal of the square of the frequency parameter which is proportional to the fluid density.

6. The apparatus of claim 5 wherein said flow controlling means includes signal operated valve means whose valving action is related to the amplitude parameter of the signal generated by said transducer means.

7. The apparatus of claim 5 wherein said flow controlling means includes pump means whose pumping action is related to the amplitude parameter of the signal generated by said transducer means.

References Cited

UNITED STATES PATENTS

| | | | |
|---|---|---|---|
| 3,095,740 | 7/1963 | Peacock | 73—32 X |
| 3,267,958 | 8/1966 | Weisheit | 137—487.5 X |
| 3,307,396 | 3/1967 | Griffo | 73—214 |
| 3,370,463 | 2/1968 | Chanaud. | |

FOREIGN PATENTS 1,235,560  5/1960  France.

CHARLES A. RUEHL, Primary Examiner

U.S. Cl. X.R.

137—487.5